Nov. 29, 1927.  
G. P. FINDLAY ET AL  
1,651,117  
DROP WIRE POLISHING MACHINE  
Filed Jan. 26, 1926   6 Sheets-Sheet 1

Inventors  
George P. Findlay  
Wm W. Johnston  
Attorneys

Nov. 29, 1927. 1,651,117
G. P. FINDLAY ET AL
DROP WIRE POLISHING MACHINE
Filed Jan. 26, 1926 6 Sheets-Sheet 2

Inventors
George P. Findlay
Wm. W. Johnston

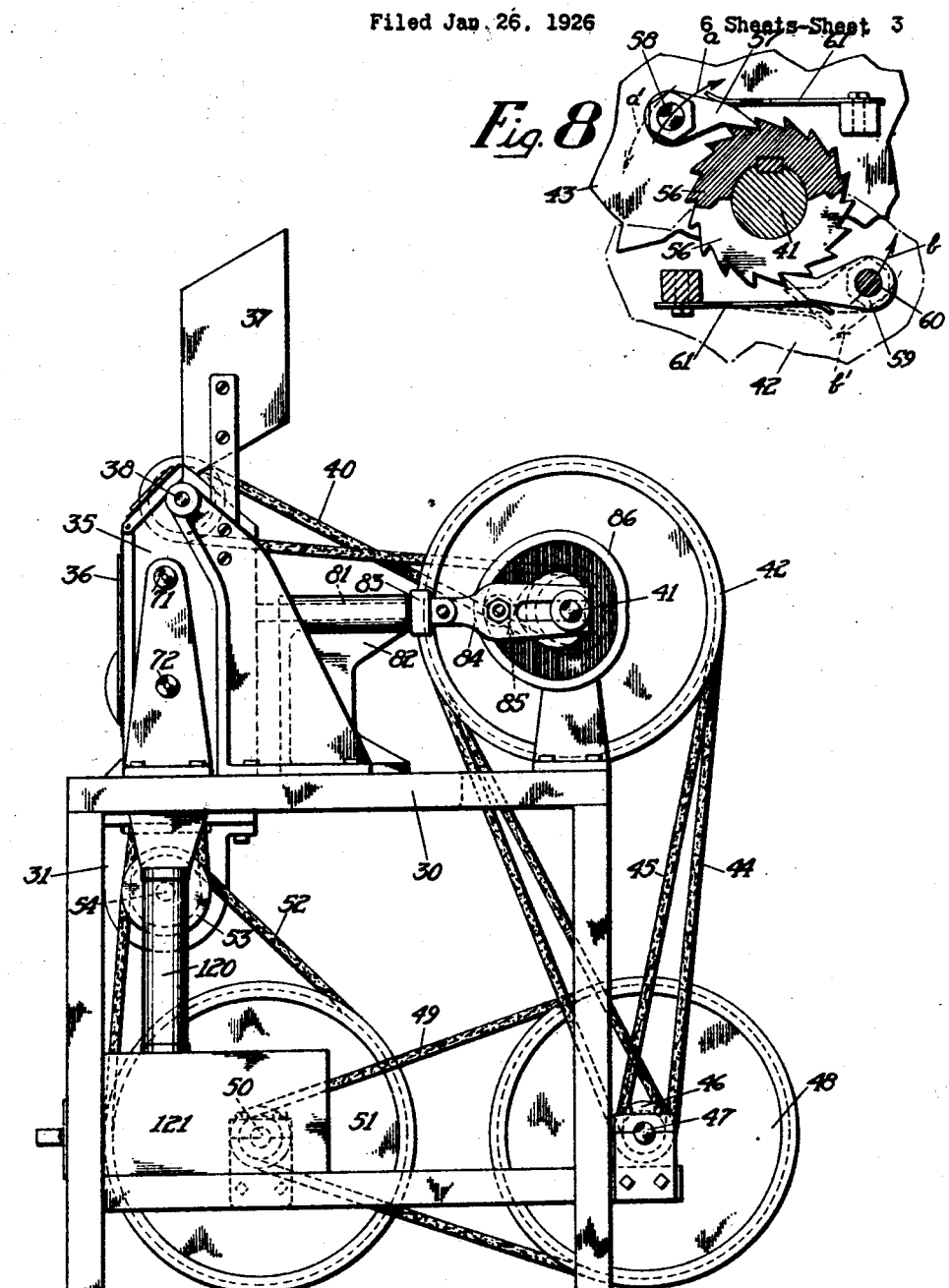

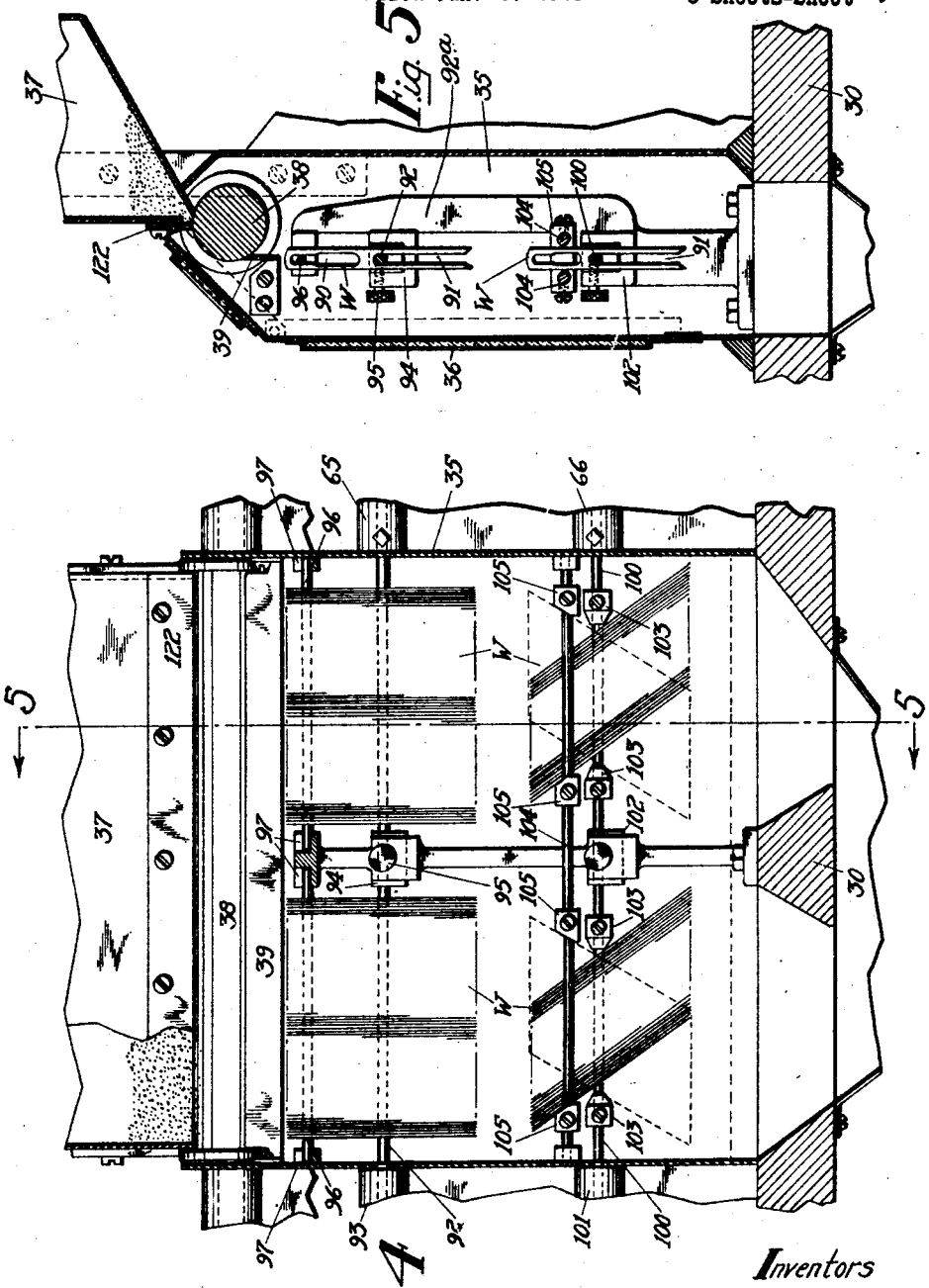

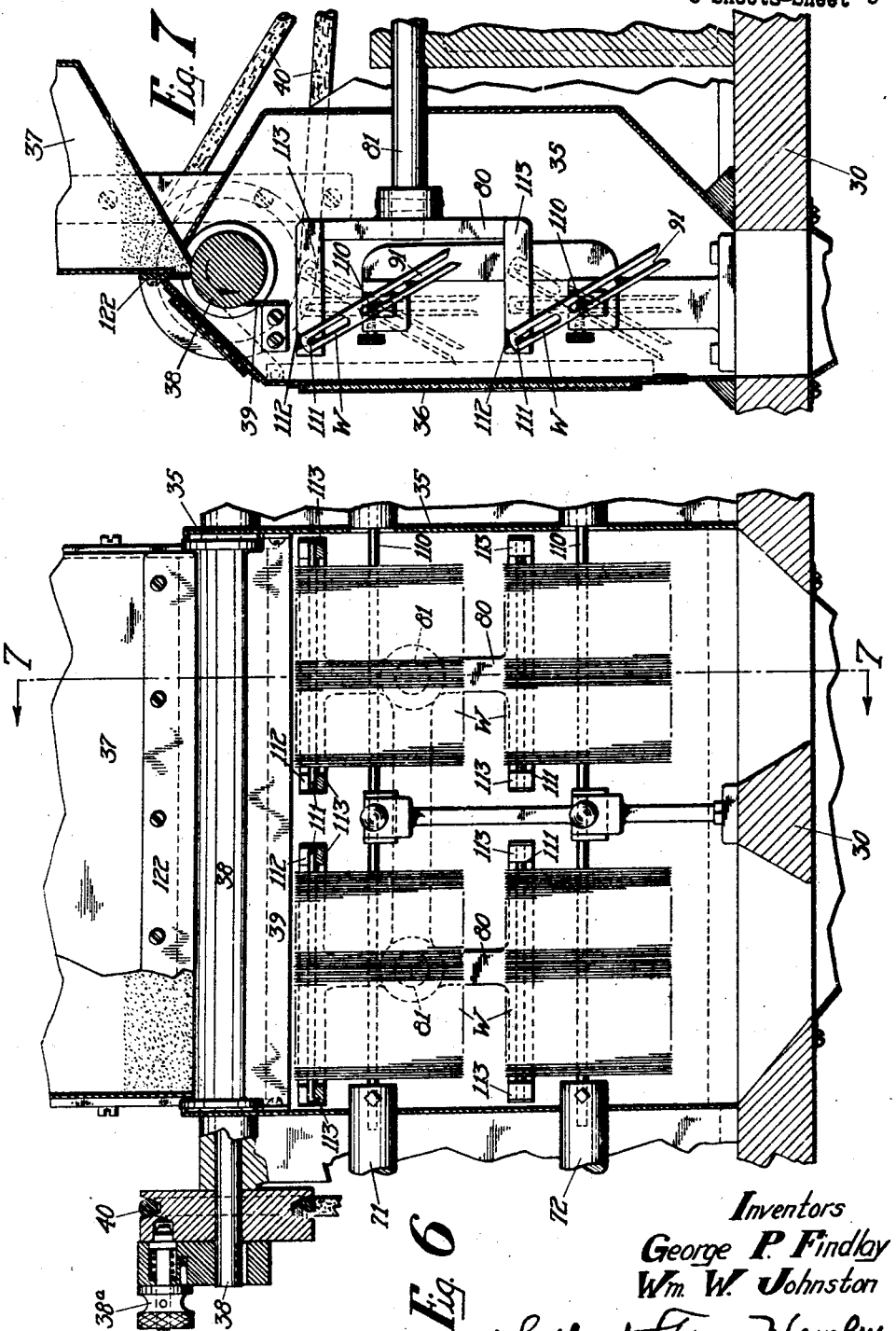

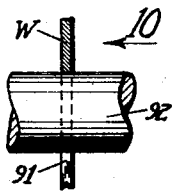
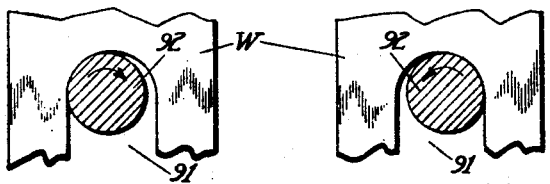
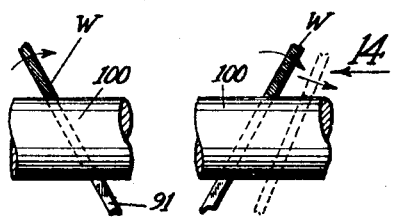
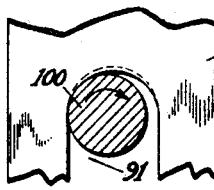
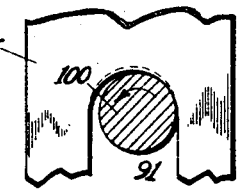
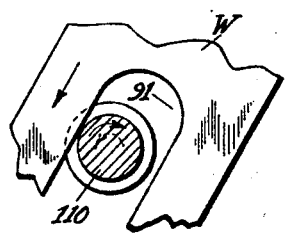
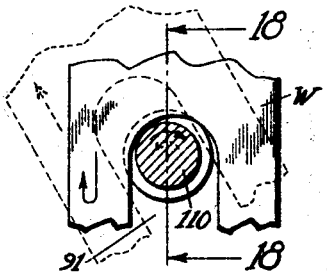
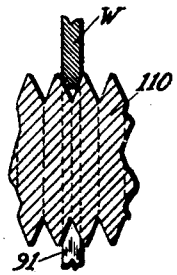
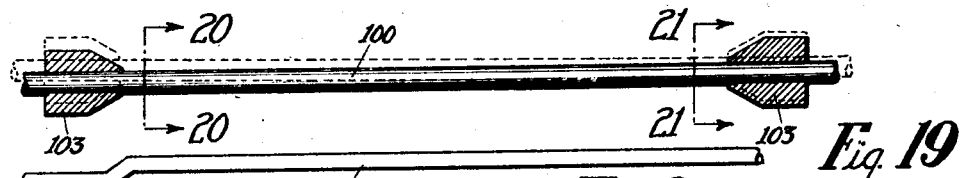
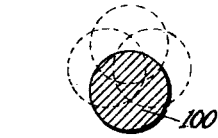

Patented Nov. 29, 1927.

1,651,117

UNITED STATES PATENT OFFICE.

GEORGE P. FINDLAY AND WILLIAM W. JOHNSTON, OF WORCESTER, MASSACHUSETTS, ASSIGNORS TO CROMPTON & KNOWLES LOOM WORKS, OF WORCESTER, MASSACHUSETTS, A CORPORATION OF MASSACHUSETTS.

DROP-WIRE-POLISHING MACHINE.

Application filed January 26, 1926. Serial No. 83,858.

This invention relates to a machine particularly designed for polishing drop wires used in warp stop motions for looms. The machine is also applicable to the polishing of flat steel heddles for loom harnesses and may be applied to the polishing of other articles of similar structure and conformation.

It is the object of our invention to provide a machine which will effectively smooth and polish all portions of the drop wires which come in contact with the warp threads and particularly at the end and sides of the longitudinal slot in the drop wire. An important feature of our invention is the provision of a construction by which drop wires are given a swinging or rocking movement longitudinally of the polishing rod on which they are supported.

Our invention also relates to certain arrangements and combinations of parts which will be hereinafter described and more particularly pointed out in the appended claims.

A preferred form of our invention is shown in the drawings in which

Fig. 3 is an end view, looking in the direction of the arrow 3 in Fig. 1;

Fig. 4 is a sectional front elevation of the left hand portion of the machine;

Fig. 5 is a sectional side elevation, taken along the line 5—5 in Fig. 4;

Fig. 6 is a sectional front elevation of the right hand portion of the machine;

Fig. 7 is a sectional side elevation, taken along the line 7—7 in Fig. 6;

Fig. 8 is a detail sectional view, taken along the line 8—8 in Fig. 2;

Figs. 9 to 18 are detail views showing the operation of the different parts of the machine in polishing a drop wire;

Fig. 19 is a plan view of the eccentric polishing rod or shaft;

Figure 1:
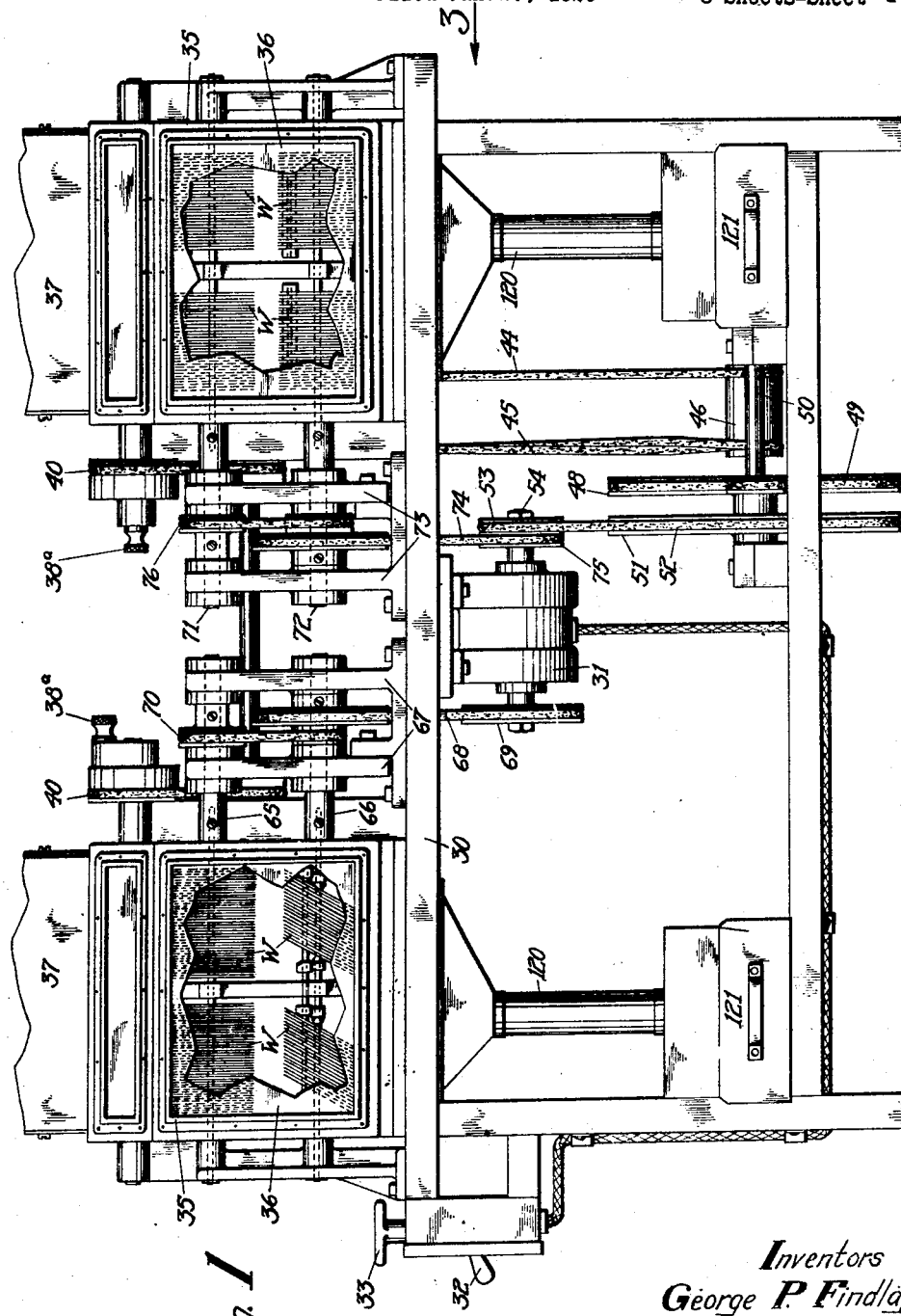
Fig. 1 is a front elevation of our improved machine.

Figs. 20 and 21 are detail sectional views, taken along the lines 20—20 and 21—21 in Fig. 19, and Fig. 22 is a plan view of the rotating polishing shaft with the eccentricity greatly exaggerated.

Referring to the drawings, we have shown our improved machine mounted upon a base or frame 30 which supports a driving motor 31 which may be started and stopped by means of a switch 32. A reversing handle 33 is also provided, by which the direction of rotation of the motor may be reversed.

Our improved polishing process is carried out in three steps, the first and second steps being performed in the left hand unit of the machine and the third step being performed in the right hand unit of the machine. Each unit comprises a casing 35 having a movable cover or front 36 which is preferably transparent, so that the operation of the machine may be observed. A hopper 37 is mounted above each casing 35 and abrasive material is transferred from the hopper to the polishing mechanism by feed rolls 38 (Figs. 5 and 7). A scraper 39 at the front of each feed roll moves the polishing material therefrom and causes it to drop directly upon the drop wires and upon the rotating polishing rods to be described.

Figure 2:
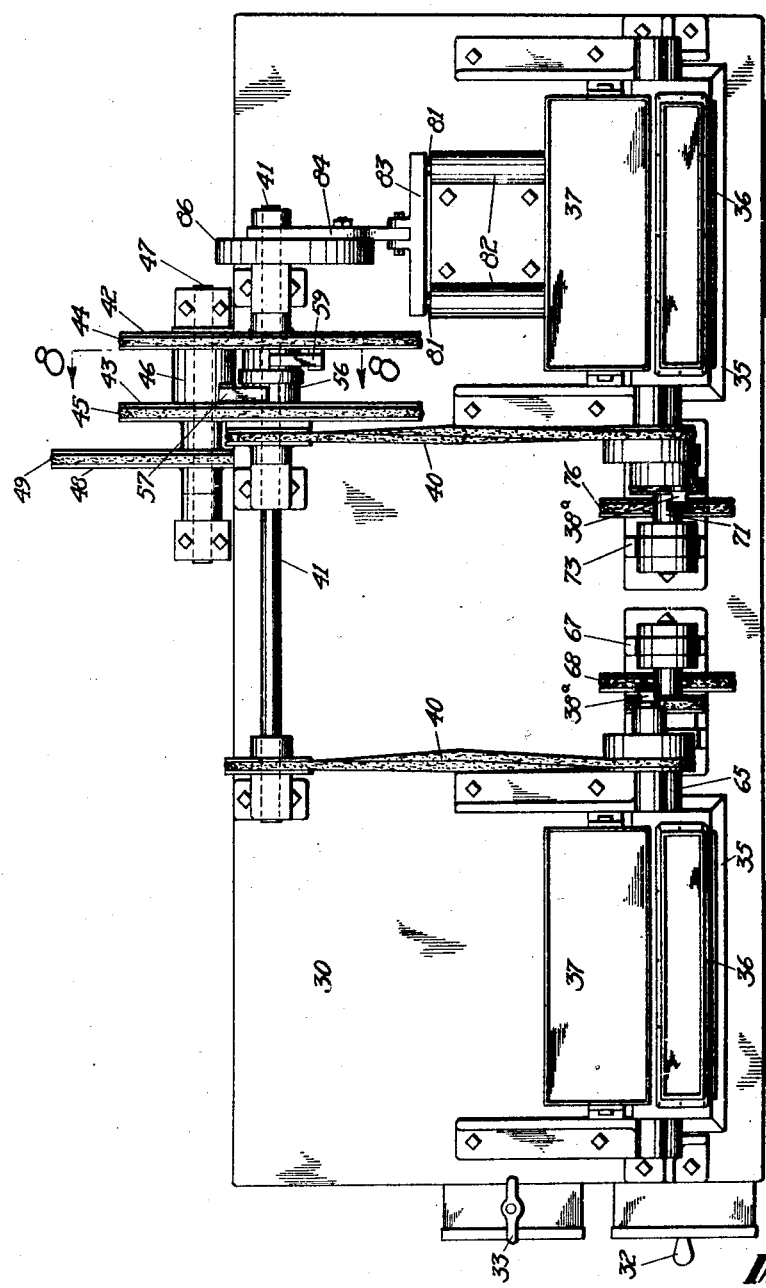
Fig. 2 is a plan view thereof.

The feed rolls 38 are rotated by cross belts 40 (Figs. 2 and 3) on a countershaft 41, upon which a pair of large grooved pulleys 42 and 43 are loosely mounted. The pulleys 42 and 43 are connected by straight and cross belts 44 and 45 to a drum 46 on a countershaft 47 at the lower rear part of the machine. A large pulley 48 on the countershaft 47 is connected by a belt 49 (Fig. 3) to a countershaft 50 in the lower front portion of the machine, and a large pulley 51 on the countershaft 50 is connected by a belt 52 to a small pulley 53 on the armature shaft 54 of the motor 31.

Through this system of belting, the large pulleys 42 and 43 on the countershaft 41 are rotated at slow speed in opposite directions. When the direction of rotation of the motor is reversed, the rotation of the pulleys 42 and 43 will also be reversed but the pulleys will still continue to rotate in opposite directions relative to each other.

It is of course essential that the feed rolls 38 should rotate continuously in the same direction, and for this purpose we have provided a special ratchet clutch mechanism for connecting the pulleys 42 and 43 to the countershaft 41. This mechanism is shown in detail in Fig. 8 and comprises a ratchet wheel 56 keyed to the shaft 41 between the pulleys 42 and 43. The two end portions of the ratchet wheel are provided with ratchet teeth and the teeth at both ends of the wheel face in the same direction, as indicated in Fig. 8.

A pawl 57 is pivoted on a stud 58 in the side of the pulley 43 and a similar pawl 59 is pivoted at 60 in the side of the pulley 42. Springs 61 hold each pawl yieldingly in contact with the ratchet wheel but permits it to slip idly over the teeth when moved backwardly relative thereto.

Assuming that the pulley 43 is being rotated in the direction of the arrow $a$ in Fig. 8, it is evident that the pawl 57 will engage the ratchet wheel 56 and positively rotate the shaft 41 in a clockwise direction. At the same time the pulley 42 will be rotated in the direction of the arrow $b$ in Fig. 8 and the pawl 59 will slip idly over the teeth of the ratchet wheel 56. If now the motor is reversed, correspondingly reversing the direction of rotation of each of the pulleys 42 and 43, the pulley 42 will thereafter rotate in the direction of the dotted arrow $b^1$ and the pawl 59 will engage the ratchet teeth of the wheel 52 and will rotate the wheel 42 and shaft 41 still in a clockwise direction, while the pulley 43 will rotate in the direction of the dotted arrow $a^1$ and the pawl 57 will slip idly over the ratchet teeth.

We have thus provided very simple driving connections by which the feed rolls will be rotated continuously in the same direction, regardless of the direction of rotation of the motor. Spring pressed locking plungers 38$^a$ (Figs. 1 and 6) may be withdrawn whenever it is desired to stop the feed from either hopper, and may be held in inoperative position by a suitable lock or stop.

In the left hand unit of our polishing machine we have provided shafts or spindles 65 and 66 (Fig. 1) mounted in bearings 67 secured to the frame 30. The shaft 66 is driven by a belt 68 from a pulley 69 on the motor shaft 54 and the shaft 65 is driven from the shaft 66 by a belt 70 connecting small pulleys on the shafts 65 and 66. The shaft 65 is preferably rotated at slightly lower speed than the shaft 66.

The right hand unit 35 is similarly provided with shafts 71 and 72 (Fig. 17) rotatable in bearings 73. The shaft 72 is driven by a belt 74 from a pulley 75 on the right hand end of the motor shaft 54 and the shaft 71 is driven by a belt 76 from the shaft 72. Shafts 71 and 72 are preferably rotated at the same speed but the driving pulley 75 is preferably smaller than the corresponding pulley 69 at the left hand end of the motor shaft and consequently the shafts 71 and 72 rotate at slower speed than the shaft 66.

The right hand portion of the machine is provided with a pair of cross heads 80 (Fig. 7) supported on plungers 81 (Fig. 2) slidable in fixed bearings 82. The rear ends of the plungers are connected by a cross bar 83 having a forked member 84 pivoted thereto and embracing the shaft 41. A cam roll 85 (Fig. 3) is mounted on the forked member 84 and is positioned in the groove or path of a side cam 86 secured on the shaft 41. The plungers 81 and cross heads 80 (Figs. 6 and 7) are thus given a slow reciprocating movement.

Referring particularly to the left hand unit of our machine as shown in Figs. 4 and 5, we will now describe the means for supporting the drop wires therein and for polishing the wires while thus supported.

One common form of drop wire to which our machine is well adapted is indicated at W in Fig. 5 and comprises a thin flat steel plate or strip having an opening 90 in its upper portion and a warp thread slot 91 in its lower portion. A polishing rod 92 (Fig. 4) is secured in the shaft or spindle 65 and is rotatable in an end bearing 93 and a center bearing 94 secured on a fixed stand 92$^a$ by a binding screw 95. Supporting rods 96 are positioned in open sockets 97, the rods 96 extending through the openings 90 in the drop wires W and preventing angular movement thereof about the axis of the rotating polishing rod 92 which extends through the slots 91 and engages the upper ends of the slots, as indicated in Figs. 9, 10 and 11.

The polishing rod 92 is of slightly less diameter than the width of the slot 91 and engages opposite side portions of the slot as the direction of rotation is reversed, as clearly shown in Figs. 10 and 11. In this first operation, the weight of each drop wire W rests directly on the polishing rod 92. The continuous feed of the abrasive from the hopper 37 supplies polishing material for the rotating rod, which quickly smooths the edges of the slot 91 which has previously been stamped or punched in the drop wire. The wires are conveniently inserted and removed by means of the supporting rods 96.

The second step to our improved polishing machine is carried out in the lower portion of the left hand unit and for this purpose a polishing rod 100 is secured in the shaft or spindle 66 and is supported in bearings 101 and 102 as previously described. The shaft 100 is provided with collars 103 which position the drop wires axially on the the rod 100. Fixed rods 104 are mounted in spaced relation above the rotating shaft 100 and engage the sides of the drop wires W to prevent lateral movement thereof. Stop plates 105 are secured on the rods 104 in adjusted position to limit the axial swinging movement of the drop wires as hereinafter described.

The polishing rod 100 is rapidly rotated by its spindle 66 and continues the polishing operation begun by the rod 92, but the polishing rod 100 is also of special construction and produces an important additional effect upon the drop wires. Each portion of the rod 100 between adjacent bearings is bent outwardly or offset so that the portion between bearings does not rotate about its own axis but rotates about an eccentric axis, as indicated in Figs. 19 and 22.

Preferably also the eccentricity progressively increases from one end to the other of the eccentric portion, so that the contact line of the rod generates a substantially conical surface of very slight eccentricity. This eccentricity is very greatly magnified in Figs. 19, 20 and 21, so as to make the eccentricity appear in the drawings, but in actual practice the eccentricity is very slight.

In Fig. 20, we have indicated the successive positions of the rod 100 as it rotates at its working point of greatest eccentricity, and in Fig. 21 we have shown corresponding positions at the opposite or least eccentric working portion of the rod. The remarkable and valuable result secured by causing the working portion of the rod to rotate about an eccentric axis is to cause the drop wires to rock back and forth longitudinally on the rotating rod during the polishing operation. The rate of the rocking movement varies somewhat according to the number of drop wires being polished at a given time and also according to the amount of eccentricity and the speed of rotation of the rod. Under average conditions, the drop wires rock back and forth from 80 to 90 times per minute when the rod 100 is making 1500 revolutions per minute.

The effect of this rocking movement is well shown in Figs. 12 and 13, which illustrate the rounding of the edges of the slot 91 by the combined rotation of the rod 100 and the rocking movement of the drop wires W. Reversal of rotation of the rod 100 also produces effects similar to those previously described for the rod 92 and as indicated in Figs. 14 and 15. The blocks 105 serve to limit the extent of the rocking movement and prevent undue separation of the drop wires.

The third process is carried out in the right hand unit of the machine in which rotating polishing rods 110 are driven by the shafts or spindles 71 and 72, previously described. The two rods 110 perform identical operations and a description of one will apply to both.

The drop wires W are supported by bars 111 held in open sockets 112 in the forwardly projecting arms 113 formed on the cross head 80 previously described. As the cross head moves forward and rearward, due to the operation of the cam 86 (Fig. 3), the drop wires are rocked back and forth laterally, as indicated in the full and dotted lines in Fig. 7, and being supported upon the rods 111, they are raised and lowered relatively to the rotating polishing rod 110.

Each rod 110 is provided with circumferential V-shaped grooves as indicated in Fig. 18. The operation of the rods 110 on the drop wires W is clearly indicated in Figs. 16 and 17. The grooves of the polishing rod engage the drop wire at the edges of the slot 91, the edges being engaged alternately upon reversal of the direction of rotation.

By these three successive polishing operations, all portions of the upper ends of the slots 91 are smoothly and effectively polished and the drop wires are placed in satisfactory condition for operation in a loom, as there are no rough edges left which might wear or break the warp threads.

During all three polishing processes a continuous feed of abrasive is provided, the abrasive falling downward from the feed rolls 38 on the drop wires W and the polishing rods. The surplus abrasive passes downward through pipes 120 (Fig. 1) to collecting chambers 121 from which the abrasive may be returned to the hoppers 37 for repeated use. The rate of feed of the abrasive may be determined by adjustable feed plates 122 (Figs. 5 and 7) which may be raised or lowered to vary the rate of feed.

Having thus described our invention and the operation thereof, it will be seen that we have provided a very simple and effective mechanism by which all of the warp engaging portions of the drop wires may be smoothly polished and a satisfactory commercial article may be produced at a minimum expenditure of time and labor.

In view of our disclosure, we do not wish to be limited to the details herein described otherwise than as set forth in the claims, but what we do claim is:

1. A drop wire polishing machine having, in combination, a rapidly rotating polishing rod upon which the drop wires are supported, said rod having portions thereof rotatable about an axis eccentric to the axis of said rod, and means to prevent angular displacement of said wires about the axis of said rod.

2. A drop wire polishing machine having, in combination, a rapidly rotating polishing rod upon which the drop wires are supported, said rod having portions thereof rotatable about an axis eccentric to the axis of said rod, and means to prevent angular displacement of said wires about the axis of said rod, the eccentricity to said rod varying progressively from one end to the other of the working portion thereof.

3. A drop wire polishing machine having, in combination, a rapidly rotating polishing rod upon which the drop wires are supported, said rod having portions thereof rotatable about an axis eccentric to the axis of said rod, means to limit movement of said wires axially of said rotating rod, and means to prevent angular displacement of said wires about the axis of said rod, the eccentricity of said rod being greater at one end than at the other of the drop wire supporting portion.

4. A drop wire polishing machine having, in combination, means to support a plurality of drop wires with a rapidly rotating polishing rod extending through slots in said drop wires, and means to automatically reciprocate said supporting means to rock said wire angularly about the axis of said rotating polishing rod and in a direction transverse thereto.

5. A drop wire polishing machine having, in combination, a drop wire polishing rod rotatable about its own axis, a second polishing rod rotatable about an eccentric axis, a third polishing rod, and means for rocking the drop wires angularly about the axis of said third rod.

6. A drop wire polishing machine having, in combination, a polishing rod adapted to extend through the slots in a plurality of drop wires, and means to rapidly rotate said polishing rod and to rock said wires back and forth longitudinally thereon during rotation thereof, said rocking movement being caused by rapid rotation of said rod about an eccentric axis.

7. A drop wire polishing machine having, in combination, a polishing rod adapted to extend through the slots in a plurality of drop wires, and means to rapidly rotate said polishing rod and to rock said wires back and forth longitudinally thereon during rotation thereof, said rocking movement being caused by rapid rotation of said rod about an eccentric axis, with the eccentricity progressively increasing from one end to the other of the eccentric working portion of said rod.

In testimony whereof we have hereunto affixed our signatures.

GEORGE P. FINDLAY.
WILLIAM W. JOHNSTON.